Figure 1:
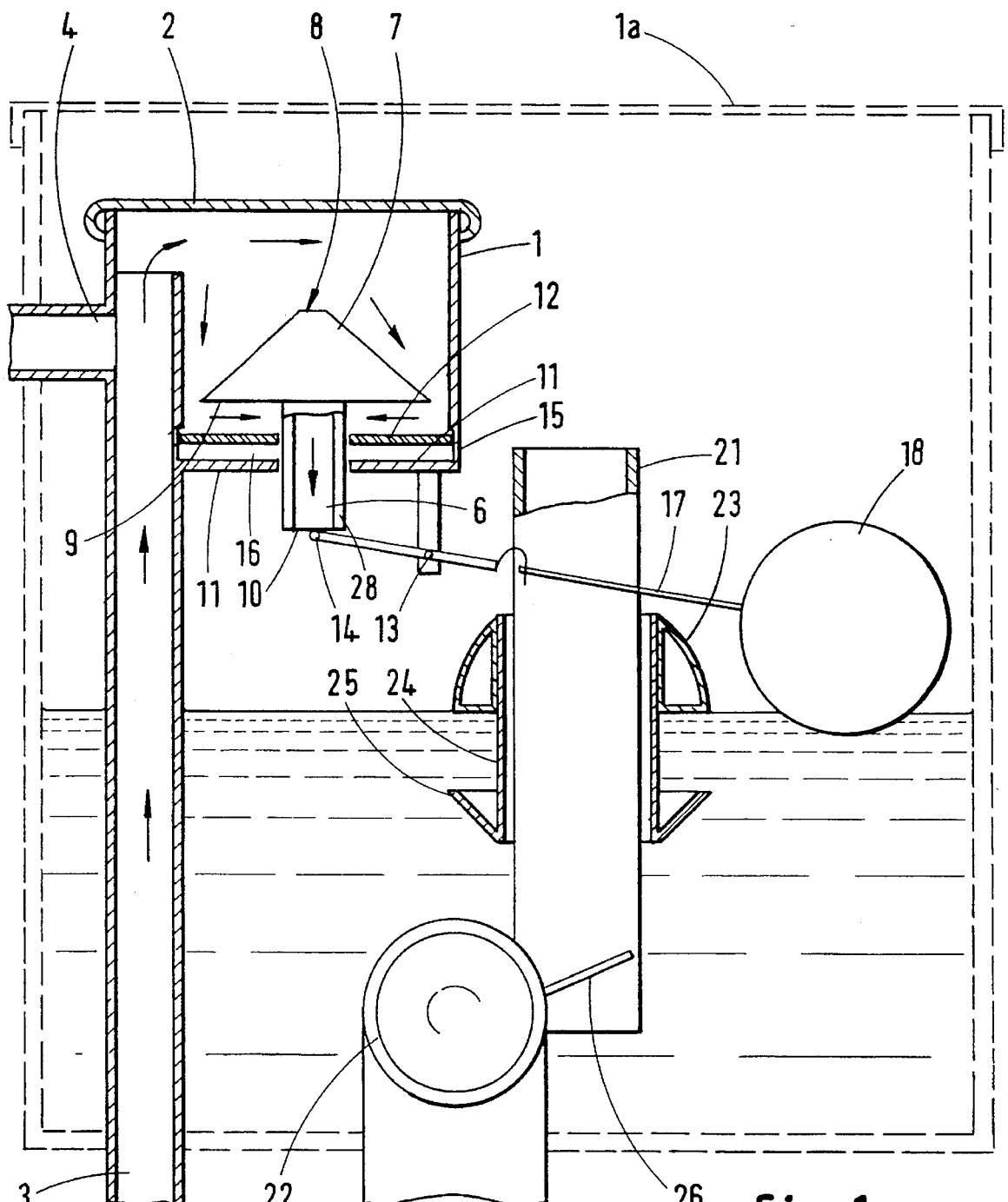

United States Patent [19]

Younes

[11] Patent Number: 5,464,037
[45] Date of Patent: Nov. 7, 1995

[54] LEVEL CONTROL VALVE ARRANGEMENT AND WATER CLOSET CISTERN

[75] Inventor: Abd El Rasoul M. Younes, Giza, Egypt

[73] Assignee: Dallah Water Saving, Giza, Egypt

[21] Appl. No.: 962,415

[22] Filed: Oct. 16, 1992

[30] Foreign Application Priority Data

Oct. 16, 1992 [EP] European Pat. Off. ............ 91309542

[51] Int. Cl.$^6$ ................. F16K 31/26; F16K 33/00; E03B 1/14
[52] U.S. Cl. .................... 137/410; 4/324; 4/325; 4/366; 4/378; 4/415; 137/423; 137/426; 137/443; 137/444
[58] Field of Search ................. 4/366, 378, 415, 4/324, 325, 394, 395, 396; 137/410, 423, 426, 434, 441, 443, 444

[56] References Cited

U.S. PATENT DOCUMENTS

| 927,368 | 7/1909 | Mauldin | 137/444 |
|---|---|---|---|
| 1,044,311 | 11/1912 | Wall | 137/426 |
| 1,109,169 | 9/1914 | Le May | 137/441 |
| 1,243,766 | 10/1917 | Schmidt | 137/444 |
| 1,279,468 | 9/1918 | Smith | 137/444 |
| 1,347,353 | 7/1920 | Striegler | 137/444 |
| 1,893,859 | 1/1933 | Gleason et al. | 137/444 |
| 2,604,113 | 7/1952 | Barsano | 137/444 |
| 2,695,031 | 11/1954 | Asselin | 137/444 |
| 2,803,262 | 8/1957 | Shellenberger | 137/423 |
| 4,032,997 | 7/1977 | Phripp et al. | 4/415 |
| 4,216,555 | 8/1980 | Detjen | 4/415 |
| 4,485,501 | 12/1984 | Kloner | 4/415 |
| 4,748,699 | 6/1988 | Stevens | 4/415 |
| 4,937,895 | 7/1990 | Stevens | 4/415 |
| 5,072,751 | 12/1991 | Lin | 137/444 |

FOREIGN PATENT DOCUMENTS

| 534933 | 4/1922 | France . |
| 636810 | 4/1928 | France . |
| 911117 | 4/1954 | Germany . |

*Primary Examiner*—George L. Walton
*Attorney, Agent, or Firm*—Ladas & Parry

[57] ABSTRACT

There is disclosed a level control valve arrangement preferably for use in a water closet cistern for controlling the liquid level in the cistern or container. The arrangement has a liquid inlet (3) feeding an inlet chamber (1) and a movable valve member (7,10) mounted on a seating (11,12) and movable between an open position in which liquid flows from the inlet into the cistern and a closed position in which liquid is prevented from flowing into the cistern. The movable valve member is biased preferably by a float arm into the closed position in response to liquid in the cistern rising to a predetermined level. The movable valve member (7,10) is mounted in the inlet chamber into which water is fed from the inlet (3) and in the closed position the valve is acted upon by a head of water in the inlet chamber to maintain the movable valve member in the closed position.

The control system is distinguished by the use of water head pressure upon an upper conical surface of the movable valve member during closure thereof thereby increasing the compactness area upon its base. When releasing the movable valve member the conical form of the valve member exceeds the water pressure on the movable member during closure and slackens the pressure on it during opening.

Advantageously, such an arrangement ensures there is no leakage of water into the cistern, the inlet valve is not affected by changes in water pressure of the inlet supply, and the contact area of the valve is substantially increased providing a considerably reduction of wear of the valve, particularly the rubber washer between the movable valve member and seating of the inlet chamber.

Conveniently, the speed of water exiting from the expulsion valve opening is increased to more quickly and easily clean a lavatory for example.

23 Claims, 2 Drawing Sheets

LEVEL CONTROL VALVE ARRANGEMENT AND WATER CLOSET CISTERN

The present invention relates to level control valve arrangement and also to a water closet cistern, which may optionally include the-level control valve arrangement. The application of the level control valve arrangement is not however restricted to water closet cisterns.

Conventional water cisterns such as the siphon type are known to utilise float control valves for controlling the flow of water into a water closet cistern. The control valve is often a restriction in the water feed pipe which is closable by a movable piston and rubber seal which together are movable back and forth to engage or disengage the valve seat and control the flow of water.

Such valves have the disadvantages of wearing out quickly because of water sealing and wear on the rubber seal because the area of control between piston seal and valve seat is small. Moreover, the closing of the valve relies on two opposed forces, namely the pressure of the water feed and the pressure applied to the piston by the float control. Disadvantageously such valve is subject to dripping or leakage as a result of undue changes in water pressure in the feed pipe.

Moreover, in such systems as used in cleaning a water closet through the traditional type cisterns, according to the international standards specification the amount of water used is nine liters of water within a period of six seconds so as to clear the water closet. This is an essential requirement of traditional siphon systems.

Furthermore, water lost as a result of seepage from control valves is valued at the rate of 10% of potable water stations production from all the world states (according to the standard international specifications to the design of potable water stations).

In addition 13.5% of the total of human consumption (per individual) is used in discharging human remains from the water closet lavatory.

This is calculated according to the human consumption range of potable water daily which is approximately 200 liters. The average use in operating the cistern of a water closet daily is considered to be three- times. In this way the aforementioned percentage is calculated to be: 3×9/200= 13.5%. This is according to the standard international specification.

This warns of the danger in making the potable water go to waste and the importance of controlling its consumption in the dry era that dominates the world and the huge financial costs for potable water production for sanitary drainage water treatment, and environmental pollution resulting from the sanitary drainage water.

Therefore, there is a pressing need to provide a new valve to control the water percolation from a feed to the water cisterns.

Moreover, this generated a further need to provide a new system to control the traditional systems, that is, to improve water flow for the purpose of making available a lesser quantity of water for use in cleaning the water closet by the same functional performance efficiency as required by the international standard specifications. In addition the chance of water seepage from the water percolation valve for cleaning the water closet during the mentioned valve closure is prevented (this is irrespective of the use, amendment or changing the known industrial compositions used in the mentioned water percolation valves or that use at present).

It is desirable to provide a level control valve arrangement in which the above mentioned disadvantages are substantially overcome.

According to one aspect of the invention there is provided a level control valve arrangement for controlling the liquid level in a container, the arrangement comprising a liquid inlet and a movable valve member mounted on a seating and movable between an open position in which liquid can flow from the liquid inlet through an outlet into the container and a closed position in which liquid is prevented from flowing through the outlet into the container, the movable valve member being provided with biasing means which biases the valve member into the closed position in response to liquid in the container rising to a predetermined level, said movable valve member being mounted in an inlet chamber which is in communication with said liquid inlet and in the closed position is acted upon by a head of liquid in the inlet chamber which acts to maintain the movable valve member in the closed position, characterised in that said movable valve member includes a sealing portion which has a sealing surface which in the open position of the valve member is exposed to liquid in the inlet chamber and in the closed position of the valve member seals against a further sealing surface disposed about the periphery of the said aperture, and a conical surface on the side of the movable valve member remote from the sealing surface thereof upon which a head of liquid in the inlet chamber is arranged to act to force the sealing surface upon the further sealing surface, and that the further sealing surface is provided by a layer of resilient material located between the outlet and the sealing surface of the movable valve member.

The above arrangement has the advantage that the wear of the valve member and its seating is reduced in particular because the head of water in the inlet chamber tends to keep the valve closed irrespective of minor fluctuations in the liquid level in the container. Accordingly, the problem of intermittent opening and closing of the valve member and the associated intermittent tinkle of liquid into the container is alleviated.

According to another aspect of the invention there is provided a water closet system comprising a normally open valve arrangement which is arranged to close a discharge outlet of the cistern when the system has partially discharged. The water closet system may optionally incorporate a level control valve arrangement in accordance with the first aspect of the invention for controlling the water level in the cistern.

The above water closet system has the advantage that the amount of water required for each flush is reduced, without compromising the force of flushing.

Preferred features of the invention are defined in the dependent claims.

Figure 2A:
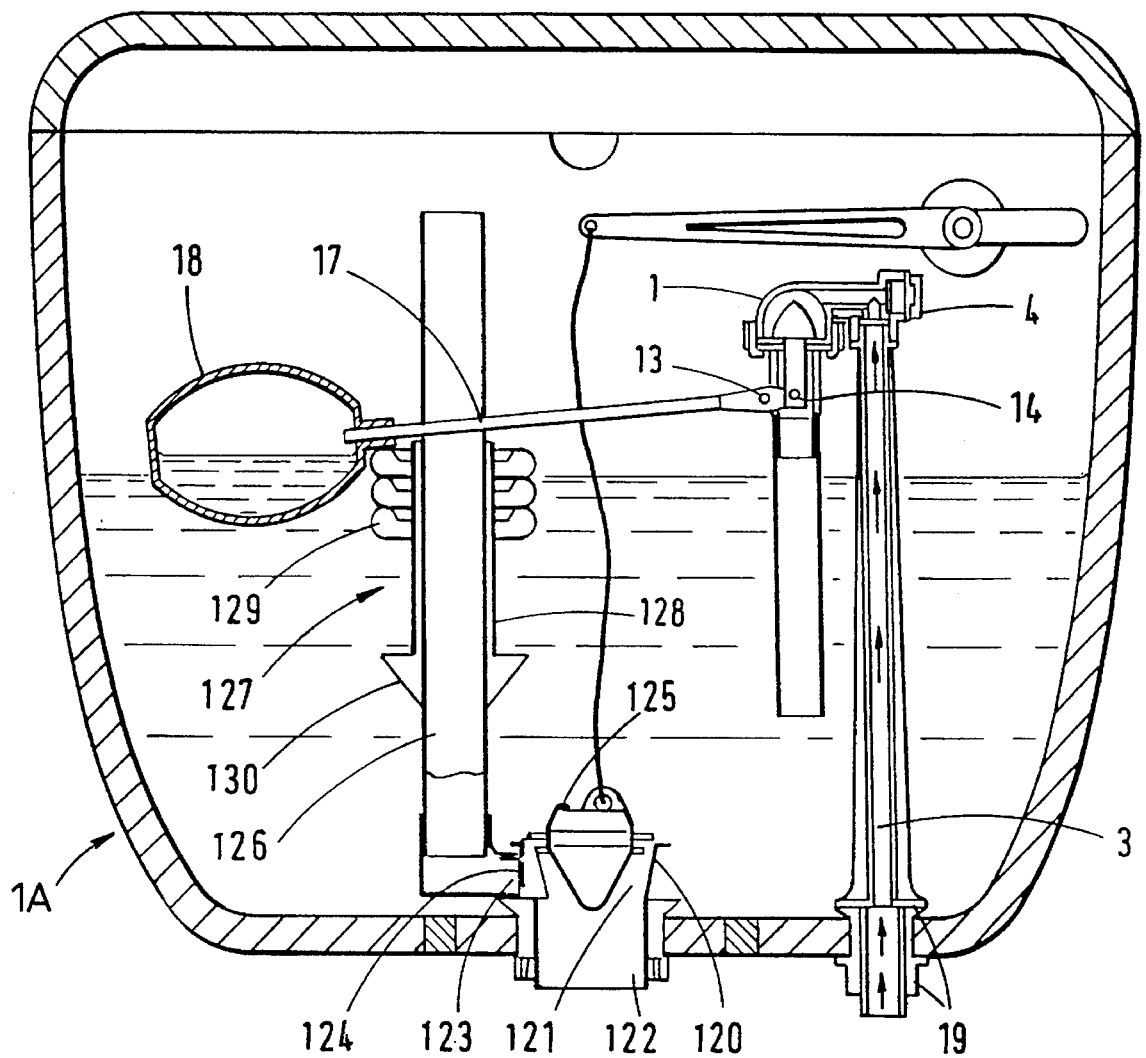
Figure 2B:
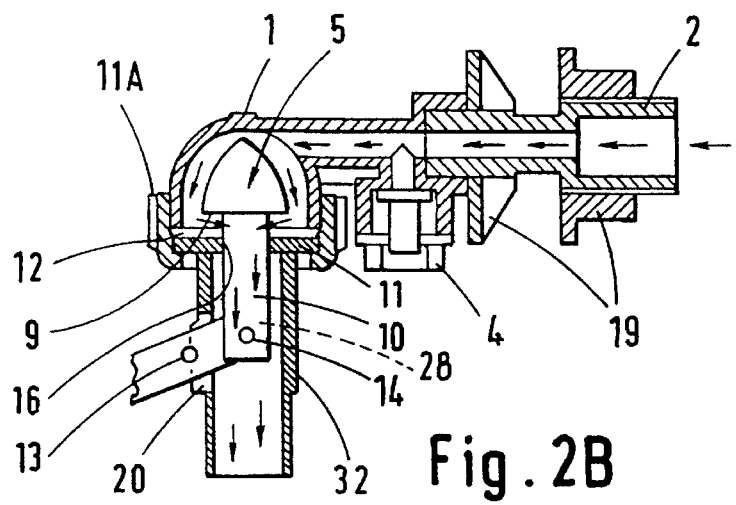

A preferred embodiment of the invention is described below by way of example only with reference to the accompanying drawing in which:

FIG. 1 is a diagrammatic cross-sectional elevational view of a water closet cistern in accordance with the invention, and FIGS. 2a and 2b are diagrammatic cross-sectional elevational views of a water closet system and level valve respectively.

The drawing of FIG. 1 shows an inlet chamber 1 mounted within a cistern 1a and provided with water inlets 3 or 4 and a vertically movable valve member 5 comprising a frusto-conical sealing portion 7 and a tubular guide member 10 carried by sealing portion 7 and located for movement in an aperture 16 of a base wall 11 of the inlet chamber. The inlet chamber 1 includes a tight fitting removable cover 2.

A lower surface 9 of the sealing portion 7 is arranged to engage a rubber washer 12 which is vertically movable (with lost motion relative to the valve member) within a lower guide portion 15 of the inlet chamber. The washer 12 has an external diameter substantially identical to the internal diameter of the portion 15 whilst its internal dimensions are substantially identical to the external dimensions of the tubular guide member 10. In the open position of the valve member as shown, water can flow as indicated by the arrows A into inlet chamber 1 and thence via elongate flow guide openings 10a extending longitudinally through and along the wall of tubular guide member 10 to bore 6 of tubular guide member 10 into the cistern.

The tubular guide member 10 may conveniently have an oval cross-section and be divided along its entire length into two spaced apart portions defining the elongate flow guide apertures therebetween. The spacings between the two portions are diametrically oppositely disposed along the minor axis of the oval cross-section.

The valve member is forced down against washer 12 and base 11 to close the valve by the action of a lever 17 located in the cistern, when the water level in the cistern reaches a predetermined level. The lever 17 carries a float 18 at one end remote form the inlet chamber 1 and is coupled to the lower end of the tubular guide 10 by a pivotal connection 14 at its opposite end. The lever float assembly is pivotally supported intermediate its ends by an intermediate pivot 13 fixedly mounted on the inlet chamber 1.

In the closed position of the valve member, water from inlet 3 or inlet 4 fills inlet chamber 1 and the resulting head of water acts on the upper conical surface 8 of portion 7 of the valve member 5 and keeps the valve closed irrespective of minor fluctuations in the water level in the cistern 19. In view of this feature and also the relatively large area of sealing surface 9, wear of the valve is substantially reduced.

The cistern also incorporates a discharge or overflow outlet 21 for excess water and this may comprise a conventional system (not shown). The overflow outlet 21 includes a valve 22 which is closed when a further float member comprising an annular float 23 disposed about the vertically aligned overflow outlet falls with the water level in the cistern to a predetermined level. The float 23 carries a rubber bushing 24 which in turn carries a ring 25 at its lower end. Ring 25 is arranged to engage a control member 26 of valve 22 only to close this valve. Accordingly, the cistern terminates each flush when the water level falls to the predetermined level. However, the form of flushing is not affected.

The operation of the cistern will now be described assuming the water level in the cistern is at its maximum level with valve 7, 10 shut and held in that position by the pressure or head of water in inlet chamber 1 acting upon the straight frusto-conical external surface of sealing portion 7.

An operating mechanism, preferably a lever (not shown) is used to open the valve 22 allowing the water in the cistern to flow therethrough into a toilet basin (not shown). As the water level in the cistern falls to a predetermined level the float 23 falls also and the ring 25 on bushing 24 acts upon valve 22 via a lever 26 to close the valve 22 which then remains closed even through the float 23 moves upwardly disengaging ring 25 from lever 26 following the ingress of fresh water though valve member 7, 10.

Simultaneously with the drop in water level in the cistern float 18 moves downwardly causing arm 17 to pivot about intermediate pivot 13 to move guide member 10 upwardly and subsequently disengage sealing portion 7 from washer 12 and base 11, against the head of water in the inlet chamber 1. The water in the inlet chamber 1 and inlet 3 then flows through aperture 16 into the cistern to fill the cistern.

When the water in the cisterns reaches its appropriate level the arm 17 pivots to move value member 5 to close aperture 16 completely sealing off the cistern from the water supply. The inlet chamber 1 then fills with water and the head of water acting upon the external frusto-conical surface. 8 of sealing portion 7 ensures the undersurface 9 of sealing portion 7 remains firmly and sealingly in contact with washer 12 and base 11 with no leakage of water through aperture 16 or bore 6 of the tubular guide member 10.

Therefore, there has been described a water closet cistern including a level control valve arrangement in which, advantageously, the area of the sealing portion 9 of the valve 5 in contact with the valve seat base 11 is much larger than hitherto known, relies on water pressure on an, enlarged surface area 8 of the sealing portion 7 to keep the sealing portion in tight control with the base thereby preventing leakage of water through aperture 16 via the elongate opening in the movable guide member. The diameter and active area of a rubber sealing washer is also greatly increased over such previously known washers. Moreover, the size of the aperture 16 and elongate openings in the guide member are less likely to blockage by scaling of water over long periods of time.

The level valve arrangement according to the present invention allows for the passage of a flushing water force relative to the overall total size of the siphon cistern for example for the purpose of removing the remnants present in the water closet, according to the standard international specifications. It controls and keeps inside the cistern a quantity of water which is more than that needed for cleaning. This is achieved by closing the water outlet valve as described above by using the float or alternatively using an interconnected or separate arm coupled with the main float arm for outlet chamber 1 or by any other means that work autonomously or by itself or mechanically or manually by suction or pressure or lifting or circulation.

Conveniently the sealing portion 7 and guide member 10 are a one piece integral moulding. Moreover, provided the base 11 is flat the washer 12 can be omitted and the undersurface 9 of the sealing portion 7 can sealingly engage base 11 without leakage through aperture 16.

The valve member 5 or more particularly, the sealing portion 7 between inlet chamber 1 and the cistern 1a is described as being frusto-conical. However, the sealing portion may take any shape or form provided it has a surface area which is (a) sufficiently large to sealingly engage the base or rubber washer between it and the base, and (b) sufficiently large in surface area so that the head of water in the inlet chamber exerts sufficient pressure thereon to tightly hold the sealing portion against the base.

The outlet valve 22 of the cistern is described as being closable by a float as the water level in the cistern falls to a predetermined minimum, however, the outlet valve may be operated by a lever connected to the float lever 17 rather than the independently operable float 23, or by any other mechanical electrical or hydraulic operable device.

In an alternative level control valve system according to the present invention the system conveniently includes a water input feed and a movable valve member located on a base and movable between an open position by a buoy or ball having a density and limited weight to float upon water percolating from the water input to the cistern through a longitudinal opening that extends on the tubular member wall. A closed position of the movable valve member is achieved when the buoy or ball is moved upwardly in the cistern by the increase in the level of water within the system to a predetermined level. The movable valve member is engageable with its base inside the input chamber through the pressure of the water head upon the buoy or ball of the control arm and on a conical surface of the movable valve member and avoids water seepage through the movable valve member and seat base irrespective of changes in water level in the cistern or the input chamber. Between the movable valve member and its base is a malleable layer to prevent water seepage. The external circumference of the malleable layer is similar in form to the external circumference of the input chamber and the external circumference to the base. Moreover, this is interrupted by the malleable barrier which has an opening that is similar with an opening in the base of the input chamber.

In addition this system is distinguished by a base, an element of the movable valve and the control arm by rotating the input chamber 360° to be fixed in any direction according to demand. The water percolation valve operates with either a horizontal or vertical feed extension by locating a stopper in place of any two extensions at the mentioned input chamber and is indicated in FIG. 1.

The movable valve member is distinguished in that it is located in an upper chamber connected to the aforementioned water input and comprises upper and lower portions the latter of which is a tubular member 10 extending from a disc like surface 9 of the upper portion 7 which also has an upper frusto-conical surface 8. The disc like surface 9 is the largest downwardly facing surface and is a planar surface. An axle is located at a lower extremity of the valve member for connecting the tubular member to one end of a control arm having a buoy or ball at its opposite end.

The movable valve member is distinguished by the water percolation opening in the tubular member extending from the movable valve head. Moreover, the valve is particularly distinguished by the enlarged diametrical valve seat engageable with a malleable disc of substantially the same diametric width as the valve seat and which is located between the valve seat and a fixed valve base of the input chamber having a water outlet aperture therein through which the tubular member extends.

In spite of the compactness of the new water control valve, the valve is also distinguished by the efficiency of operation, performance and by its flexibility of use on all kinds of water cisterns.

Conveniently, the use of water head pressure on the other conical surface of the movable valve member during its closure leads to the effective expansion of the area of the sealing member of its compactness on the base.

The pressure applied by the water upon the conical surface of the movable valve member is greater than the water pressure on the movable member during its closure and the shape of the conical surface has the effect of releasing pressure on it during opening of movable member.

The interconnection of the movable valve member, control arm carrying at one end the float or buoy, and the dimensions of the input chamber work together for operating the valve autonomously with the fall and rise in the water level within the water closet system.

Advantageously, these features prevent the chance of water seepage from between the movable member and its base. Moreover, long use of the movable valve member, its base, and malleable layer compactness adds to the expansion of the seat tangent area as described below.

The use of different diameters of an expulsion valve of the cistern opening is distinguished by a quicker water force speed through the expulsion valve opening to clean a water closet lavatory for example.

Accordingly, the expulsion valve according to the present invention is distinguished by the quick water percolation to clean the water closet and outlet opening in a conical form in the base of the cistern tapering inwardly in the direction of water flow from the expulsion box during the opening of the valve for the purpose of cleaning the water closet lavatory.

The fast flow outlet of the lavatory cleaning water is further distinguished by the fact that the outlet opening has a gate on one wall suspended on an axle which allows the passage of a fixed percentage of atmospheric air to facilitate speed of water through the conical ! outlet during the expulsion valve opening.

Conveniently, the fast flow of the water from the expulsion valve opening leads to the force of water in the lavatory for removing the remains and cleaning of the lavatory. Therefore, a high efficiency is obtained for the performance which uses 50% of the water to achieve the same results as the conventional systems.

The use of the overall pressure of the water used in the known system with the emission of a predetermined quantity of water for the purpose of cleaning is improved by control in closing the expulsion valve gate by any manual or independent means. This is achieved in the present invention by the expulsion valve being closed by an additional float or buoy. The float or buoy comprises a tubular extension having at its upper extremity a ring or variable member of rings mounted on the extension. This has the purpose of fixing the quantity of the water demanded to be supplied in advance. The lower extremity of its extension bears a preferably inverted conical float ring for the purpose of closing the mentioned expulsion gate valve.

The additional floating buoy is distinguished by having a density, weight and fixed specifications and is of a hollow cylindrical form and it includes inside it an incompact form, an additional water overflow pipe (earlier indicated at 21 in FIG. 1). The movement of the additional buoy is distinguished with its facility of moving upwardly with the water height and downward with the water fall in the mentioned expulsion box.

The control system is distinguished in closing the expulsion gate valve closure by other different means as the weight of the mentioned expulsion valve gate or attaching the movement of the mentioned expulsion valve gate to the movement of the control arm buoy work or the control arm work movement or the movement of the operating knob handle work or the operating knob work movement.

Advantageously, the control in closing the expulsion valve realises a 50% saving of the traditional expulsion box water within a period of 3 seconds and the same functional performance efficiency is achieved. More particularly, to save 7% of the international production of the potable water used at present with no reduction in cleaning effect. The chance of water seepage from between the expulsion valve gate and its base is eliminated by that continual pressure of water present in the cistern box continually on the expulsion valve gate cover when it is lead by the mentioned buoy or by any other means.

An alternative embodiment will now be described in more detail with reference to FIGS. 2a and 2b. FIG. 2a discloses an inlet chamber 1 shown in more detail in FIG. 2b, and it is fixed by support connectors 19 t a cistern 1-A. The inlet chamber is connectable also to a water inlet 2 and 3 and a stopper 4 to close one of the mentioned water inlets. A movable valve member 5 extending vertically in the drawing has a compacting upper surface 8 in a conical form with a lower planar surface 9 and a tubular member 10 extending from the planar surface in a longitudinal axial direction. The tubular member 10 is located for movement in a water outlet opening, that is, inside the input chamber which is in two parts interconnected by an assembling locking screw thread arrangement 13.

A sealing disc like member 12 is located between the movable valve member 5 and base 11. The sealing disc like member 12 is of malleable material to prevent water seepage and the outer circumference thereof is similar to the external circumference of the input chamber 1 and the external circumference to the base 11. In addition there is in between the member 13 and opening that is similar with the opening 11 in base 11 the locking through thread arrangement 13 serves also to clamp the disc like member 12 between base 11 and the inlet chamber 1 as shown in FIG. 2B.

When, the water level falls in the container the movable valve member autonomously opens by the floating buoy or ball 18 on control, arm 17 having a high density and fixed weight, mounted at the centre of gravity by a pivotal axis 15. The end of the tubular member 10 remote from the valve head 7 is connected by axle 14 to control arm 17 the arm 17 in turn extends through part 20 which itself extends outwardly from the cylindrical extension 32 of the input chamber. In an open position water gushes in the direction shown by the arrows to the inside of the input chamber 1 and consequently through opening 6 that is in the tubular member 7 and extends in a longitudinal direction from below the centre of the planar surface 9 to the axle 14 and when the water gushes from the tubular member opening it is contained by the hollow cylindrical extension 12 until it exits from the outlet thereof.

The movable valve member is completely closed by the control arm 17. This occurs when the water in the cistern reaches a pre-determined level when the movable disc like surface 9 sits on member 7 on its base 11 and according to what is indicated by arrows the water gushes from the feed extension 2 or 3 to the inside of the input chamber 1. The, water presses on the conical surface 8 and controls the valve closure irrespective of any variations in the water level in the container or the input chamber 1.

FIGS. 2a and 2b illustrate the traditional type operation of the explusion valve 120 fixed appropriately by wire or string for example to the innermost end of the expulsion valve having a conical form. The valve has a base 121 and extends in the direction of, the water flow and outlet end 122 in the direction of the water closet lavatory and is provided with a cover 125 for preventing the water flow during its closure and also is available on its wall a water flow openings 123 for any excess water which is closed and opened by a gate 124 which is mounted on an axle at the highest point of the water outlet increasing water opening, and allows the passage of a fixed percentage of air during its closure in the direction of the water pipe base 126 and it opens in the direction of the water flow to the water closet the lavatory to remove excess from the cistern.

FIG. 2a illustrates an additional floating buoys 127 mounted coaxially about the air inlet tubers 126 to the valve 124 and having an extension 128 preferably on its upper end a ring or rings 129 and on its lower end a ring 30 for closing the expulsion valve opening and to prevent the water flow from the cistern to the water closet lavatory.

Therefore there has been described a new valve system which uses the water pressure of a water supply upon a conical surface of a movable valve member to control the water passing from the feed to a water system for example as a form of expulsion box. Traditionally closet siphon expulsion boxes have an independent operating system which includes a water inlet 2, 3 and a movable valve member 5, 7 which is movable between an open and closed position against a sealing member 9 which prevents water seepage and a base 11. When the water falls in the container the movable valve member is opened by a control arm 17 connected to the valve at one end and at its opposite end is connected to a float or buoy 18 of a density and weight arranged to float upon the water in the expulsion box or cistern through a longitudinal opening 8 in the wall of a tubular member 7. When the water rises in the cistern to a predetermined level the movable valve member sits on its base inside an input chamber 1 by the force of the control arm 17 and float 18, and the water head in the input chamber which acts upon the conical surface 5 of the movable valve member to firmly control the seating or engagement of the movable valve member. Because of the extremely large contact area between the valve and the resilient sealing member water seepage is prevented. The external circumference of the sealing member 12 is substantially similar to the external circumference of the edge of the input chamber and the external circumference of the base 11. In addition, there is between the seepage seal 9 an opening that is similar with the opening that is in between the seat base and the seat base 11 and the force arm 17. Both rotate around the input chamber through 360° or less and are fixed in one direction, that is according to the demand and in the case of operating a horizontal input chamber 2 the stopper 4 is fixed in place of the head input 3 and vice versa. The movable valve member is preferably located in an input chamber connected to the water input 2 or 3. The movable valve member comprises a disc like contact surface 9 and an upper surface 8 which is of a conical format in an axial direction through the movable valve member. Extending from the disc like planar surface 9 is a tubular member 7 having a longitudinally extending opening 6 for the purpose of providing water flow from the input chamber to the cistern. Towards the end of the tubular member remote from the disc like surface 9 is mounted an axle to which is connected a control arm 17 which is pivotally mounted on a part 16 extending prominently from a hollow cylindrical extension coaxial with the tubular member 7. A float or ,buoy 18 is connected to the control arm 17 at its end remote from the tubular member 7.

Conveniently, the use of water head pressure upon the upper conical surface 8 to the movable valve member 7 during closure leads to a comparative increase to the area of compacting the movable valve member as it sits on the sealing member 12 preventing seepage and its plain base or the conical one. Preferably the sealing member 12 is of a malleable material.

Advantageously, when releasing the movable valve member the upward pressure upon the water formed by the conical surface of the movable valve member exceeds the water pressure on the movable member and the reduced pressure assists opening of the valve. In addition, the form of the upper conical surface of the movable valve member, the control arm with its floatable buoy having a density and fixed weight, the gravity point of the control arm and the dimensions of the input chamber all work for independent operation of the movable valve member within the rise and fall of the water cistern.

In the control in the system shown in FIG. 2a an outlet from the system is controlled by an expulsion valve having a conical format which engages base 121 of the opening inside the water cistern. The opening consists of a relatively short tubular member having an enlarged diameter portion at its end inside the cistern and a smaller diameter externally of the cistern. The tapering portion of the outlet tapers inwardly in the direction of movement of water from the cistern passing the outlet end 122 into a lavatory, for example, and is available to receive the opening stopper 125 for preventing the flow of water from the opening when closed.. An overflow water-pipe and air feed pipe 126 is connected to one side of the expulsion valve outlet to provide an opening 123 independently closed and opened by a gate 124 in response to the passage of air or water through pipe 26. The gate is mounted on an axle located in an upper wall of the water opening. The passage 126 allows a fixed percentage of air that is, restricted by the diameter of the pipe 26 to pass during closure and opens in the direction of the water flow to the lavatory for the purpose of water flow from cistern to the lavatory exceeding that which has normally been achieved with traditional systems of similar size.

The use of a variable diameter or tapering portions 120 in the outlet of the cistern has the effect of increasing the speed of water flow thus applying the water to a lavatory with greater force than otherwise.

The speed of flow through the outlet of the cistern is further enhanced by the flow of air past gate 124 through opening 123 of the outlet.

Conveniently, the expulsion valve is closable by a second float which is preferably located about the water overflow pipe 126 and comprises a tube to the upper end of which in FIG. 2a is mounted a first float 129 comprising a plurality of independent rings which can be located at various locations along the length of the tube 128.

When the cistern is operated and the expulsion valve is opened water flows through the outlet 122 to clean the lavatory and the water level within the cistern falls. As the water falls the floats 18 and 129 also drop and when the water level is sufficiently low a further float 130 connected to the lowermost end of the tube 128 engages a point 125 on the expulsion valve and forces the expulsion valve against its seat 121 thereby closing off the outlet 122. As will be appreciated by controlling the siting of the float rings 129 on the tube 128 the minimum water level within the cistern can be controlled.

The system disclosed is distinguished in the use of the overall pressure of water used over the traditional water closet with the flow of a fixed quantity of water beforehand for cleaning the lavatory. This is achieved by controlling the closing of a traditional expulsion valve gate either manually or by other independent means using the weight of the expulsion valve gate or attaching the control arm to the expulsion valve gate or bonding the control arm movement to the expulsion valve gate movement, or binding the operating knob arm movement to the movement with the expulsion valve gate.

Advantageously, the system is distinguished over the traditional expulsion valve gate by the additional buoy or float or any manual or independent means which substantially removes the chance of delaying the expulsion valve gate preventing water seepage for the cause of delaying the closure of the expulsion valve gate.

Conveniently, the system is distinguished in providing more than a 50% saving in water consumed over that presently used in cleaning the water closet lavatory using a traditional cistern. Moreover, water seepage from between the expulsion valve gate and its base is assisted by the pressure of the quantity of water present in the cistern being continually applied to the expulsion valve gate when closed by the additional floating buoy or any other means.

Reference to liquid throughout this specification is to be taken as reference to fluids.

Whilst the invention has been described above with particular reference to a toilet cistern which is preferably of the siphon type, the invention is equally applicable to control in the manner described the storage and dispensing of any fluid matter preferably in liquid or gaseous form.

I claim:

1. A level control valve arrangement for controlling the liquid level in a container, the arrangement comprising a valve housing in the container, a liquid inlet extending into the valve housing to define an intermediate wall portion therein, and a movable valve member mounted within the valve housing on a seating of an outlet aperture from the valve housing and being movable between an open position in which liquid can flow from the liquid inlet between the intermediate wall and the outlet aperture seating and through the outlet aperture into the container and a closed position in which liquid is prevented from flowing through the outlet aperture into the container, the movable valve member having a flow guide extending therefrom through the outlet aperture of the valve housing for directing liquid therethrough out of the valve housing and being provided with biasing means which biases the valve member into the closed position in response to liquid in the container rising to a predetermined level, said movable valve member being mounted in an inlet chamber within said valve housing, which chamber is in communication with said liquid inlet so that in the closed position of the valve liquid flows from the liquid inlet into the valve chamber to form a head of liquid in the inlet chamber which acts on the movable valve member to maintain the movable valve member in the closed position, wherein said movable valve member includes a sealing portion which has a planar sealing surface which in the open position of the valve member is exposed to liquid in the inlet chamber and in the closed position of the valve member seals against a planar seating surface disposed about the periphery of said outlet aperture and extends between the intermediate wall and an outer wall portion of the valve housing, the valve member planar surface extending over the area of the planar seating surface to provide an effective seal over substantially the entire area of the valve member planar sealing surface, and a conical surface on the side of the movable valve member remote from the planar sealing surface of the sealing portion upon which conical surface the head of liquid in the inlet chamber from the liquid inlet acts to sealingly force the planar sealing surface against the planar seating surface, and that the planar seating surface is provided by a layer of resilient material located between the planar seating surface and the planar sealing surface of the removable valve member.

2. An arrangement according to claim 1, wherein said layer of resilient material is provided by a washer (12) of resilient material.

3. An arrangement according to claim 2, wherein said washer is movable in the axial direction of the said movable valve member (7,10).

4. An arrangement according to claim 1, wherein said movable valve member (7,10) includes a tubular guide member (10) which extends through an aperture (16) in a wall (11) of said inlet chamber for liquid from said inlet chamber (1) to said container when the valve member is in its open position.

5. An arrangement according to claim 1, wherein the conical surface has a planar cross-section in the axial direction of the movable valve member.

6. An arrangement according to claim 1, wherein the conical surface has a convex cross-section in the axial direction of the movable valve member.

7. An arrangement according to claim 1, including a further valve located between two inputs (2,4) for directing liquid through one of said inputs.

8. A flow control valve of the type having a housing, means for supplying liquid into the housing to define an intermediate wall portion therein, and a valve member arranged to cooperate with a valve seat of an outlet aperture from the valve housing and being movable within the valve housing between a first position with respect to said valve seat where said aperture associated with the valve seat is closed and a second position with respect to said valve seat where the said aperture is open to allow passage therethrough of said liquid, said valve member having a flow guide extending therefrom through said aperture of the valve housing and having a generally planar sealing portion extending between the flow guide and outer peripheral edge of the valve member, said valve seat having a generally planar seating portion adapted to be sealed by said planar sealing portion of said valve member, said planar seating portion extending between the intermediate wall portion and an outer wall portion of the valve housing and having means defining said aperture through said seating portion, the valve member planar sealing surface extending over the planar seating surface to provided an effective sealing therebetween over substantially the entire area of the valve planar sealing surface, and a generally conical surface portion opposing said planar sealing portion, wherein fluid is arranged to flow from the inlet into the valve housing so that the body of the fluid therein acts on the conical surface portion to sealingly force the valve planar sealing portion against the planar seating portion of the valve seat, and wherein when the valve is open fluid flows between the planar sealing and seating surfaces through the outlet aperture and downwardly along the said tubular valve guide on the valve member and projecting through said aperture.

9. The flow control valve of claim 8 further comprising a sealing washer disposed between said sealing portion of said valve member and said seating portion of said valve seat.

10. The flow control valve of claim 8 wherein a cross-section of said valve member tapers non-linearly away from said generally planar sealing portion in an axial direction of said valve member.

11. The flow control valve of claim 8 wherein a cross-section of said valve member tapers non-linearly away from said generally planar sealing portion in an axial direction of said valve member.

12. A flow control valve of claim 11 wherein further characterised by said valve member has means for guiding said valve member between said second position, in which said liquid is enabled to flow along said generally planar seating portion of said valve seat and through said aperture, and said first position, in which said generally planar sealing portion of said valve member sealingly engages said generally planar seating portion of said valve seat.

13. A flow control valve of the type having a valve housing, means for supplying liquid into the housing to define an intermediate wall portion therein and a valve member mounted within the valve housing and arranged to cooperate with the valve seat of an outlet aperture of the valve housing, the valve member being movable within the valve housing between a first position with respect to said valve seat where said aperture associated with the valve seat is closed, and a second position with respect to said valve seat where the said aperture is open to allow passage therethrough of said liquid, said valve member including a generally planar sealing portion having a planar sealing surface and flow guide means extending from the planar sealing surface through said aperture of the valve housing for directing said liquid through said aperture, said planar sealing surface extending in a direction transverse to and from said flow guide means to the outer peripheral edge of said valve member; a planar seating surface said planar seating surface extending between the intermediate wall portion and an outer wall portion of the valve housing, said planar seating surface defining said aperture therein and extending from said aperture by an amount at least corresponding to the area over which said valve member planar sealing surface extends thereby to provide an effective seal therebetween over the entire area of the valve planar sealing surface, and generally conical surface portion opposing said planar sealing portion, the body of liquid acting on the conical surface to sealingly engage the planar sealing portion and planar seating surface, and having means defining said aperture through said planar seating portion, and wherein said flow guide means has liquid entry means adjacent said planar sealing portion whereby in said second position of said valve member with respect to said valve seat said liquid is arranged to flow between said planar seating portion and said planar sealing portion into said liquid entry means and through said flow guide means so that said liquid passes through said aperture of said valve seat.

14. The flow control valve of claim 13 further comprising a sealing washer disposed between said sealing portion of said valve member and said seating portion of said valve seat.

15. The flow control valve of claims 13 wherein a cross-section of said valve member tapers non-linearly away from said generally planar sealing portion in an axial direction of said valve member.

16. A flush tank for a water closet and the like of the type having a container for flushing liquid, said container having a discharge outlet for flushing the said closet and the like, liquid inlet means comprising a flow control valve having a housing, said liquid inlet having an intermediate wall portion extending into the valve housing a valve member arranged to cooperate with the valve seat of an outlet from the valve housing and being movable within the valve housing between a first position with respect to said valve seat where said aperture associated with said valve seat is closed, and a second position with respect to said valve seat where said aperture is open to allow passage therethrough of liquid into the container between a valve member planar sealing surface and a valve seat planar seating surface, into flow guide means extending from the valve member, through said aperture, and means in the container responsive to a level of said flushing liquid rising in the container to a predetermined level to move said valve member to said first position and responsive to said level of said flushing liquid falling substantially below said predetermined level to move said valve member to said second position, said valve member including flow guide means extending from the planar sealing surface through said aperture of the valve housing for directing said liquid through said aperture, said planar sealing surface extending in a direction transverse to and from said flow guide means to the outer peripheral edge of said valve member; a planar seating surface defining said aperture therein and extending from said aperture by an amount at least corresponding to the area over which said valve member planar sealing surface extends thereby to provide an effective seal over the entire area of the valve member planar sealing surface, said planar seating surface extending between the intermediate wall portion and an outer wall portion of the valve housing and said valve seat has a generally planar seating portion adapted to be sealed by said planar sealing portion of said valve member when a body of liquid is inputted into the valve housing from the inlet pipe, and a generally conical surface portion opposing said planar sealing portion,i a body of liquid being arranged to act on the conical surface to sealingly engage the valve member planar sealing portion and the planar seating portion, and means defining said aperture through said planar seating portion.

17. The flush tank of claim 16, wherein said container has a normally open valve arrangement which is arranged to close a discharge outlet of the flush tank when the flush tank has partially discharged.

18. The flush tank of claim 17, wherein said normally open valve arrangement comprises a float member which is arranged to close said discharge outlet when the water level in the flush tank falls below a predetermined level.

19. The flush tank of claim 18, wherein said float member is of a generally cylindrical form and is mounted for sliding motion along a generally upright overflow discharge member.

20. The flush tank of claim 19, wherein the discharge outlet has a portion which is tapered inwardly in the direction of liquid flow therethrough for increasing speed of flow of liquid through the discharge outlet.

21. The flush tank of claim 20, including an overflow aperture located in the wall of the discharge outlet, a liquid overflow pipe connected to the overflow aperture for directing overflow liquid and air through the overflow aperture, and a gate located in said overflow aperture for controlling opening of the overflow aperture in response to the flow of liquid and air through the overflow pipe.

22. The flush tank of claim 21, wherein the float member has a variable number of float rings located at an uppermost end thereof, the number being selectable according to a desired level of liquid within the flush tank.

23. The flush tank of claim 22, wherein an operating member is connected to the lowermost end of the float member for closing the valve of the discharge outlet of the flush tank when the level of liquid in the flush tank falls to a predetermined level.

* * * * *